United States Patent
Goto (10) Patent No.: US 8,823,501 B2
(45) Date of Patent: Sep. 2, 2014

(54) VEHICLE PRESENCE NOTIFICATION APPARATUS

(75) Inventor: Koichi Goto, Kariya (JP)

(73) Assignee: Denso Corporation, Kariya (JP)

( * ) Notice: Subject to any disclaimer, the term of this patent is extended or adjusted under 35 U.S.C. 154(b) by 134 days.

(21) Appl. No.: 13/551,729

(22) Filed: Jul. 18, 2012

(65) Prior Publication Data

US 2013/0033367 A1 Feb. 7, 2013

(30) Foreign Application Priority Data

Aug. 2, 2011 (JP) .................................. 2011-169200

(51) Int. Cl.
*B60Q 1/00* (2006.01)
*B60Q 5/00* (2006.01)

(52) U.S. Cl.
CPC ...................................... *B60Q 5/008* (2013.01)
USPC ................. 340/425.5; 340/686.1; 340/825.44

(58) Field of Classification Search
USPC ........ 340/425.5, 474, 384.1, 384.73, 6.1, 7.2, 340/7.58, 686.1, 460, 825.44
See application file for complete search history.

(56) References Cited

U.S. PATENT DOCUMENTS

| 5,649,314 A | * | 7/1997 | Yamada et al. | 340/7.38 |
| 6,198,510 B1 | * | 3/2001 | Suzukawa et al. | 348/552 |
| 2003/0044022 A1 | * | 3/2003 | Ishida | 381/58 |
| 2011/0032087 A1 | * | 2/2011 | Nakayama et al. | 340/384.1 |

FOREIGN PATENT DOCUMENTS

| JP | 2005-289175 | 10/2005 |
| JP | 2008-258863 | 10/2008 |

* cited by examiner

*Primary Examiner* — Daniel Previl
(74) *Attorney, Agent, or Firm* — Nixon & Vanderhye P.C.

(57) ABSTRACT

An ultrasonic generation element provides a primary resonance portion existing in an ultrasonic frequency band, and is caused to perform only a notice sound generation by parametric speaker. An audible-sound generation piezoelectric speaker provides a primary resonance portion existing in an audible frequency band, and is caused to switch between a notice sound generation by dynamic speaker and a notice sound generation by parametric speaker, based on vehicular information. Under a predetermined low vehicle speed, a notice sound is generated in both (i) an area ahead of a vehicle and distant from the vehicle, and (ii) an area surrounding the vehicle. When the vehicle speed increases, a notice sound is generated at a position ahead of the vehicle and more distant from the vehicle.

12 Claims, 8 Drawing Sheets

ULTRASONIC AFTER AM

FIG. 4D

ULTRASONIC DURING DISTORTION

FIG. 4E

AFTER SELF-DEMODULATE

FIG. 5A

HEADING

FIG. 5B

HEADING

HEADING

FIG. 7B

HEADING

FIG. 8

VEHICLE PRESENCE NOTIFICATION APPARATUS

CROSS REFERENCE TO RELATED APPLICATION

This application is based on Japanese Patent Application No. 2011-169200 filed on Aug. 2, 2011, the disclosure of which is incorporated herein by reference.

TECHNICAL FIELD

The present disclosure relates to a vehicle presence notification apparatus that generates a notice sound outside of a vehicle to report a presence of the vehicle in a vicinity of the vehicle. In particular, it relates to a technology used for a quiet vehicle such as an electric vehicle, a fuel cell vehicle, and a hybrid vehicle.

BACKGROUND

[Patent Document 1] JP 2005-289175 A

There is proposed a vehicle presence notification apparatus which reports or announces a presence of a vehicle using a notice sound (for example, refer to Patent document 1). The vehicle presence notification apparatus in Patent document 1 generates a notice sound using a dynamic speaker that directly generates an audible sound. The vehicle presence notification apparatus is required to generate a notice sound of a predetermined sound pressure (for example, 50 dB) in a predetermined range (for example, the range of 10 m) in the vehicle heading direction (e.g., in front of the vehicle) in order to notify a pedestrian of the approach of the vehicle.

The dynamic speaker generates an audible sound directly; thus, it has a wide directionality (i.e., weak directionality). When generating a notice sound in the dynamic speaker, a loud notice sound sounds also in a direction different from the heading direction of the vehicle, thus providing a cause of vehicle noises.

To address the above, a vehicle presence notification apparatus may use a parametric speaker which has a narrow directionality (i.e., strong directionality) and generates a notice sound at a position distant from the vehicle. The parametric speaker applies an ultrasonic modulation to a "waveform signal of an audible sound (notice sound)," and emits an ultrasonic wave as a modulated signal from an ultrasonic wave speaker. The ultrasonic wave (sonic wave not heard by an ear of a human being) radiated from the ultrasonic wave speaker contains modulated components, which will undergo a self-demodulation in the air in a course of the transmission or propagation. An audible sound (i.e., notice sound) is thereby generated (i.e., become audible) at a position distant from the vehicle.

As mentioned above, the parametric speaker has a narrow directionality and can generate a notice sound only in a limited direction such as a heading direction of a vehicle. When using the parametric speaker, a notice sound may be therefore not generated in a direction different from the heading direction of the vehicle. It is impossible to notify a person in the direction different from the heading direction (e.g., a position in the vehicle-width direction) of the presence of the vehicle.

That is, when only using the dynamic speaker, a notice sound is generated to be too loud in a direction different from the heading direction of the vehicle, causing a disadvantage. When only using the parametric speaker, a notice sound is generated to be too soft in a direction different from the heading direction of the vehicle, causing a disadvantage.

SUMMARY

Under such a situation mentioned above, the inventor of the present application studied the use of both a "dynamic speaker" and a "parametric speaker," to address the above disadvantages. Specifically, a notice sound generator in a vehicle includes (i) an audible-sound dedicated dynamic speaker that generates only an audible sound, and (ii) an ultrasonic-wave dedicated ultrasonic wave speaker that generates only an ultrasonic wave. In this regard, however, such a configuration of including both the speakers may result in an increase in costs.

The present disclosure is made in view of the above. It is an object to provide a technology reducing a cost of a vehicle presence notification apparatus which can generate both a notice sound using an audible sound by dynamic speaker and a notice sound using an ultrasonic wave by parametric speaker.

To achieve the above object, according to an aspect of the present disclosure, a vehicle presence notification apparatus is provided as follows. The apparatus generates a notice sound in an area outside of a vehicle when a driving condition to report a presence of the vehicle is satisfied. The apparatus includes an audible-sound generation piezoelectric speaker that provides a primary resonance portion existing in an audible frequency band. When vehicular information satisfies a predetermined first condition, the vehicular information being one of a travel state of the vehicle and a travel environment of the vehicle, the audible-sound generation piezoelectric speaker is caused to perform an audible notice sound direct generation to generate directly a notice sound being audible. In contrast, when the vehicular information satisfies a predetermined second condition, the audible-sound generation piezoelectric speaker is caused to perform an ultrasonic emission to emit an ultrasonic wave that is prepared by applying an ultrasonic modulation to a signal to form a notice sound.

Under such a configuration, the audible-sound generation piezoelectric speaker generates both of (i) a notice sound using an audible sound by dynamic speaker and (ii) a notice sound using an ultrasonic wave by parametric speaker; thus, costs in the vehicle presence notification apparatus can be suppressed.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

An embodiment of the present disclosure will be explained with reference to drawings. A vehicle presence notification apparatus generates a notice sound outside of a vehicle when a driving condition to report a presence or existence of the vehicle is satisfied. A notice sound generator 1 included in the vehicle presence notification apparatus contains (i) more than one ultrasonic generation element 2 which provides a primary resonance portion existing in an ultrasonic frequency band, and (ii) more than one piezoelectric speaker 3 for generating audible sounds (hereinafter, also referred to as an audible-sound generation piezoelectric speaker 3), the speaker 3 providing a primary resonance portion existing in an audible frequency band.

The ultrasonic generation elements 2 generate only a notice sound by parametric speaker. In contrast, the audible-sound generation piezoelectric speakers 3 generate both "a notice sound by dynamic speaker" and "a notice sound by parametric speaker," depending on vehicular information (a vehicle speed, a weather, an ambient noise, etc.).

In specific, a vehicle presence notification apparatus includes an information determination device or means 15 which determines whether vehicular information satisfies a predetermined first condition or a predetermined second condition. The vehicular information includes a vehicle travel state such as a vehicle speed, or a vehicle travel environment such as a weather or an ambient noise level. The vehicle presence notification apparatus is provided as follows: (i) when the information determination device 15 determines that the vehicular information satisfies the first condition, the audible-sound generation piezoelectric speakers 3 are caused to directly generate a notice sound being an audible sound, and (ii) when the information determination device 15 determines that the vehicular information satisfies the second condition, the audible-sound generation piezoelectric speakers 3 are caused to emit an ultrasonic wave that is prepared by applying an ultrasonic modulation to a signal which forms a notice sound.

That is, vehicle presence notification apparatus in this embodiment is provided as follows: (i) when the driving condition to report a presence of the vehicle is satisfied and the information determination device 15 determines the vehicular information matches with the first condition, the ultrasonic generation elements 2 generate a notice sound by parametric speaker and, simultaneously, the audible-sound generation piezoelectric speakers 3 generate a notice sound by dynamic speaker (refer to FIG. 5A); and (ii) when the driving condition to report a presence of the vehicle is satisfied and the information determination device 15 determines the vehicular information matches with the second condition, the ultrasonic generation elements 2 generate a notice sound by parametric speaker and, simultaneously, the audible-sound generation piezoelectric speakers 3 also generate a notice sound by parametric speaker (refer to FIG. 5B).

EXAMPLES

The following will explain specific examples to which an embodiment of the present disclosure is applied with reference to drawings. The examples described in the following are detailed examples; naturally, the present disclosure is not limited to the detailed examples. In the following examples, ones having the same reference number have the same function.

First Example

A first example will be explained with reference to FIGS. 1 to 5B. The vehicle presence notification apparatus that is mounted in a host vehicle is to report a presence of the host vehicle or to notify a person of the presence of the vehicle, using a notice sound such as a dummy engine sound. For example, the host vehicle may be (i) a vehicle having no internal combustion engine such as an electric vehicle and a fuel cell electric vehicle, (ii) a vehicle that can stop an engine during traveling or stopping such as a hybrid vehicle, (iii) a vehicle that can stop an engine during stopping such as an idling stop vehicle, or (iv) a conventional vehicle having an engine but traveling in a low sound volume.

The vehicle presence notification apparatus includes a notice sound generator 1 which generates a notice sound towards an outside of the vehicle, and a control circuit 4 that performs an operation control of the notice sound generator 1.

(Explanation of Notice Sound Generator 1)

Figure 5A:
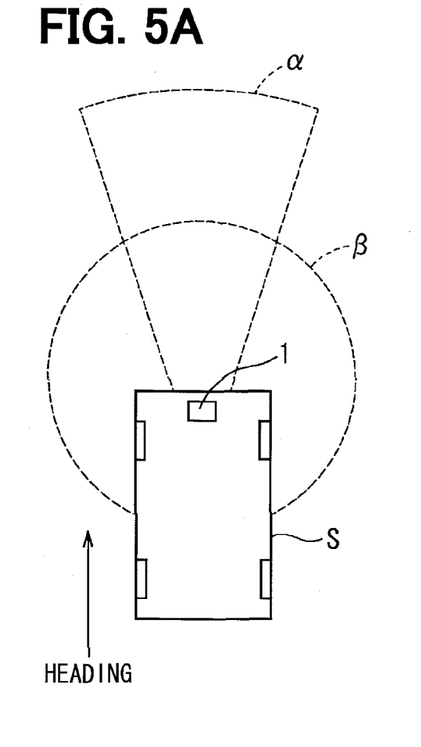
FIG. 5A is a diagram illustrating a reachable range of a notice sound at a low speed of a vehicle according to the first example.
Figure 5B:
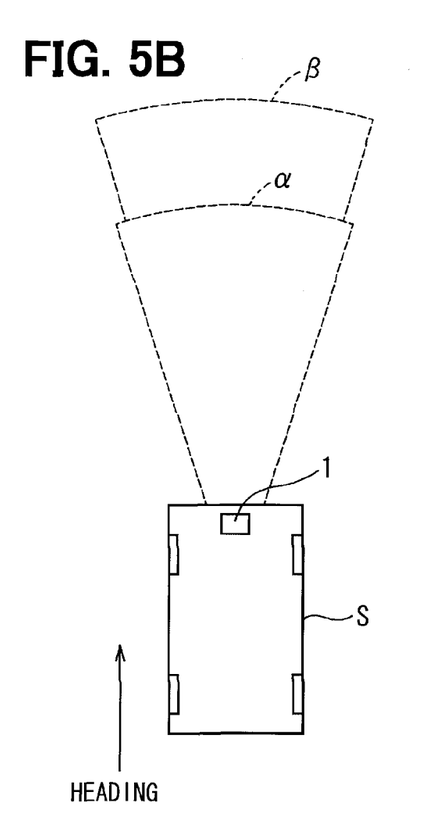
FIG. 5B is a diagram illustrating a reachable range of a notice sound at an intermediate speed of a vehicle according to the first example.

The notice sound generator 1 emits a notice sound towards an area ahead of the vehicle; the notice sound includes a notice sound by parametric speaker and a notice sound by dynamic speaker. For example, as illustrated in FIGS. 5A, 5B, the vehicle presence notification apparatus is attached to a front portion of a vehicle S (for example, a position in between a front grille and a heat exchanger of the vehicle S.

In specific, the notice sound generator 1 of the present example includes (i) more than one ultrasonic generation element 2 which provides a primary resonance portion A existing in an ultrasonic frequency band, (ii) more than one audible-sound generation piezoelectric speaker 3 that provides a primary resonance portion B existing in an audible frequency band, and (iii) a housing that internally contains the ultrasonic generation elements 2 and audible-sound generation piezoelectric speakers 3.

Figure 2:
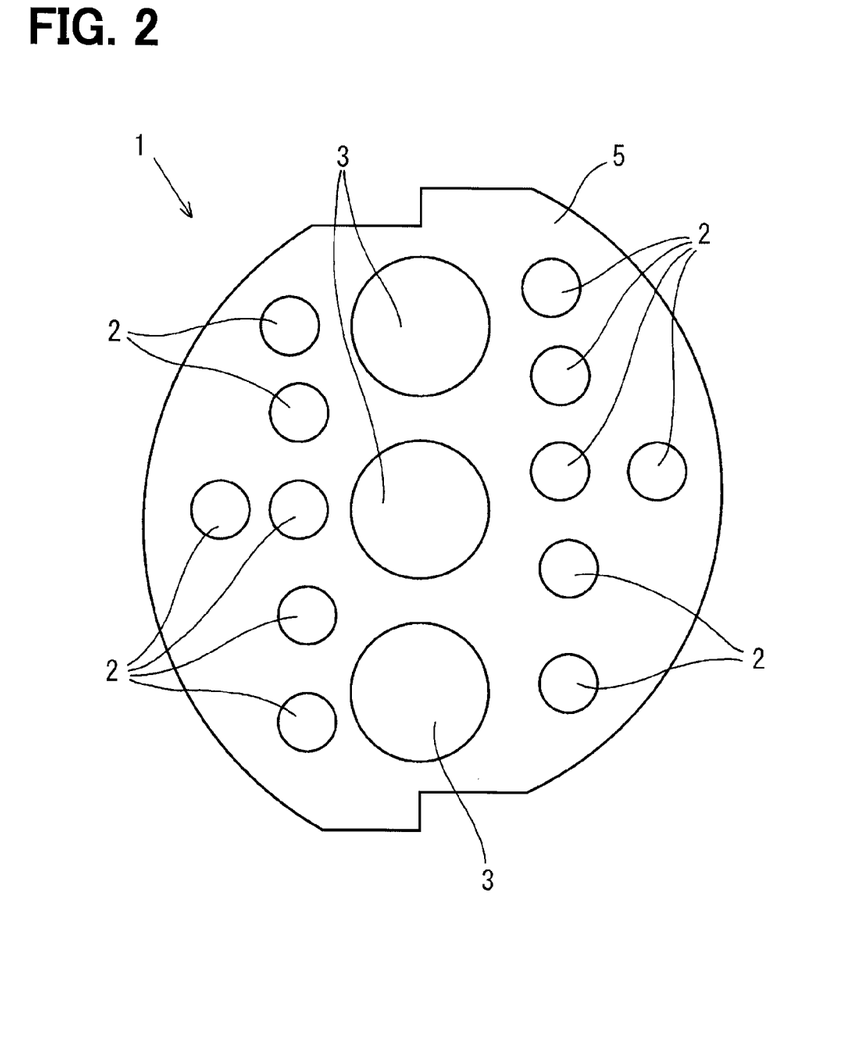
FIG. 2 is a diagram illustrating an example of arrangement of an audible-sound generation piezoelectric speaker and an ultrasonic generation element according to the first example.

The ultrasonic generation elements 2 and the audible-sound generation piezoelectric speakers 3 are attached to a common support plate 5 that is fixedly attached to a position inside of the housing; the ultrasonic generation elements 2 and the audible-sound generation piezoelectric speakers 3 are provided in a collective arrangement as a speaker array as illustrated in FIG. 2. Further, all the ultrasonic generation elements 2 may be collectively referred to as an ultrasonic generation element unit and all the audible-sound generation piezoelectric speakers 3 may be collectively referred to as an audible-sound generation piezoelectric speaker unit.

Figure 3A:
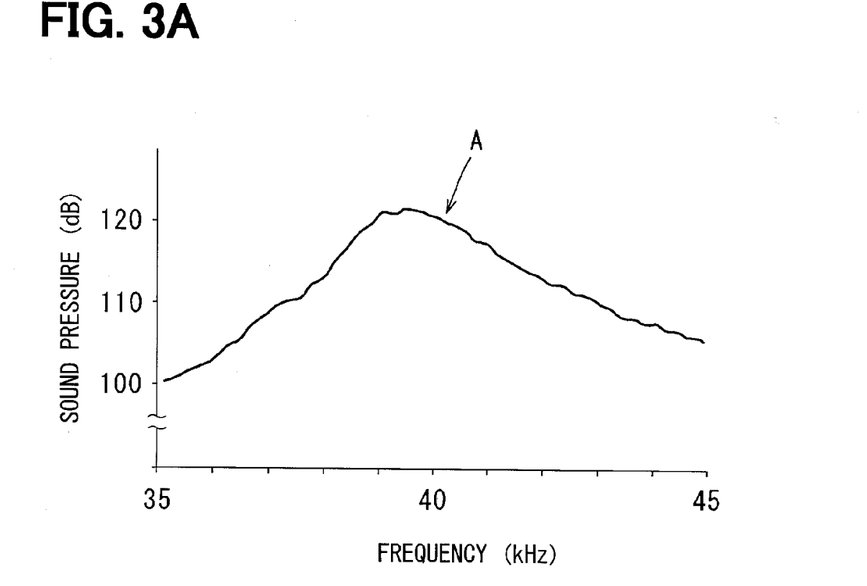
FIG. 3A is a diagram illustrating a frequency characteristic of an ultrasonic generation element according to the first example.

A detailed example of the ultrasonic generation element 2 is a small-sized piezoelectric speaker made for the purpose of the ultrasonic generation. The ultrasonic generation element 2 is formed by using a light small-size piezoelectric element that is extended and contracted according to an applied voltage (charge and discharge), and a light small-radius diaphragm (i.e., vibrating plate) that is driven by expansion and contraction of the piezoelectric element to thereby generate waves of condensation and rarefaction in air. That is, the ultrasonic generation element 2 is provided for the ultrasonic generation. As illustrated in FIG. 3A, the ultrasonic generation element 2 provides a primary resonance portion A (primary resonance frequency) of a vibration system (piezoelectric element+diaphragm) that exists in an ultrasonic frequency band (for example, about 40 kHz).

Figure 3B:
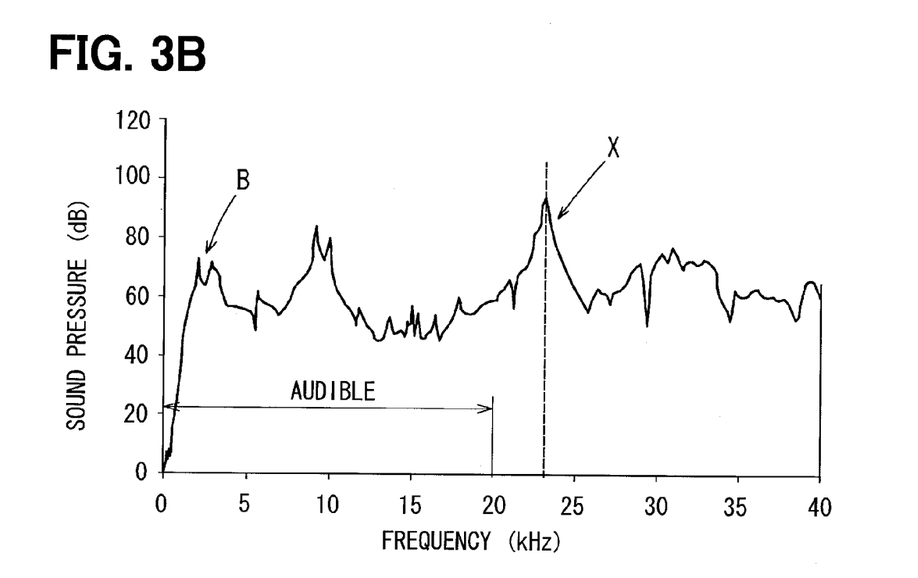
FIG. 3B is a diagram illustrating a frequency characteristic when the audible-sound generation piezoelectric speaker performs ultrasonic oscillation according to the first example.

The audible-sound generation piezoelectric speaker 3 is provided for the purpose of the audible sound generation to generate sound waves in an audible frequency band. As illustrated in FIG. 3 (b), the audible-sound generation piezoelectric speaker 3 provides a primary resonance portion B (primary resonance frequency) of a vibration system (piezoelectric element+diaphragm) that exists in an audible frequency band (for example, about 2 kHz). The audible-sound generation piezoelectric speaker 3 is provided by using a large-size piezoelectric element that is extended and contracted according to an applied voltage (charge and discharge), and a large-radius diaphragm (i.e., vibrating plate) that is driven by expansion and contraction of the piezoelectric element to thereby generate waves of condensation and rarefaction in air.

As a detailed example, each audible-sound generation piezoelectric speaker 3 of the present example uses a speaker that is primarily used for informing a vehicle occupant of vehicular information by audio (e.g., speech or beep sound). For generating an audible frequency, the audible-sound generation piezoelectric speaker 3 has a diaphragm with an outside diameter about two to four times larger than the diameter of the ultrasonic generation element 2 manufactured for the ultrasonic generation.

The housing contains the support plate 5 on which the ultrasonic generation elements 2 and the audible-sound generation piezoelectric speakers 3 are mounted; the housing has an ultrasonic emission aperture (opening) which emits a sonic wave (condensation and rarefaction waves of the air) towards an area ahead of the vehicle; the sonic wave is generated by each ultrasonic generation element 2 and each audible-sound generation piezoelectric speaker 3. The ultrasonic emission aperture of the housing is provided with a waterproofing device or means to prevent a rain water from entering an inside of the housing. The ultrasonic emission aperture is provided with (i) a waterproof sheet that enables transmission of an ultrasonic wave as well as an audible sound, and (ii) a louver disposed in front of the waterproof sheet, as an example of the waterproofing device. (Explanation of Control Circuit 4)

The control circuit 4 may be disposed in the housing of the notice sound generator 1, or may be mounted in the vehicle S as an independent body separated from the notice sound generator 1. The control circuit 4 receives vehicular information from an ECU (Engine Control Unit) etc.; the vehicular information includes a vehicle travel state (e.g., vehicle speed) of the vehicle S, or a vehicle travel environment (e.g., weather, ambient noise level) of the vehicle S. When the driving condition for reporting a presence of the vehicle S is satisfied, the control circuit 4 drives the ultrasonic generation elements 2 and the audible-sound generation piezoelectric speakers 3 to thereby generate a notice sound in an area outside of the vehicle S.

Figure 1:
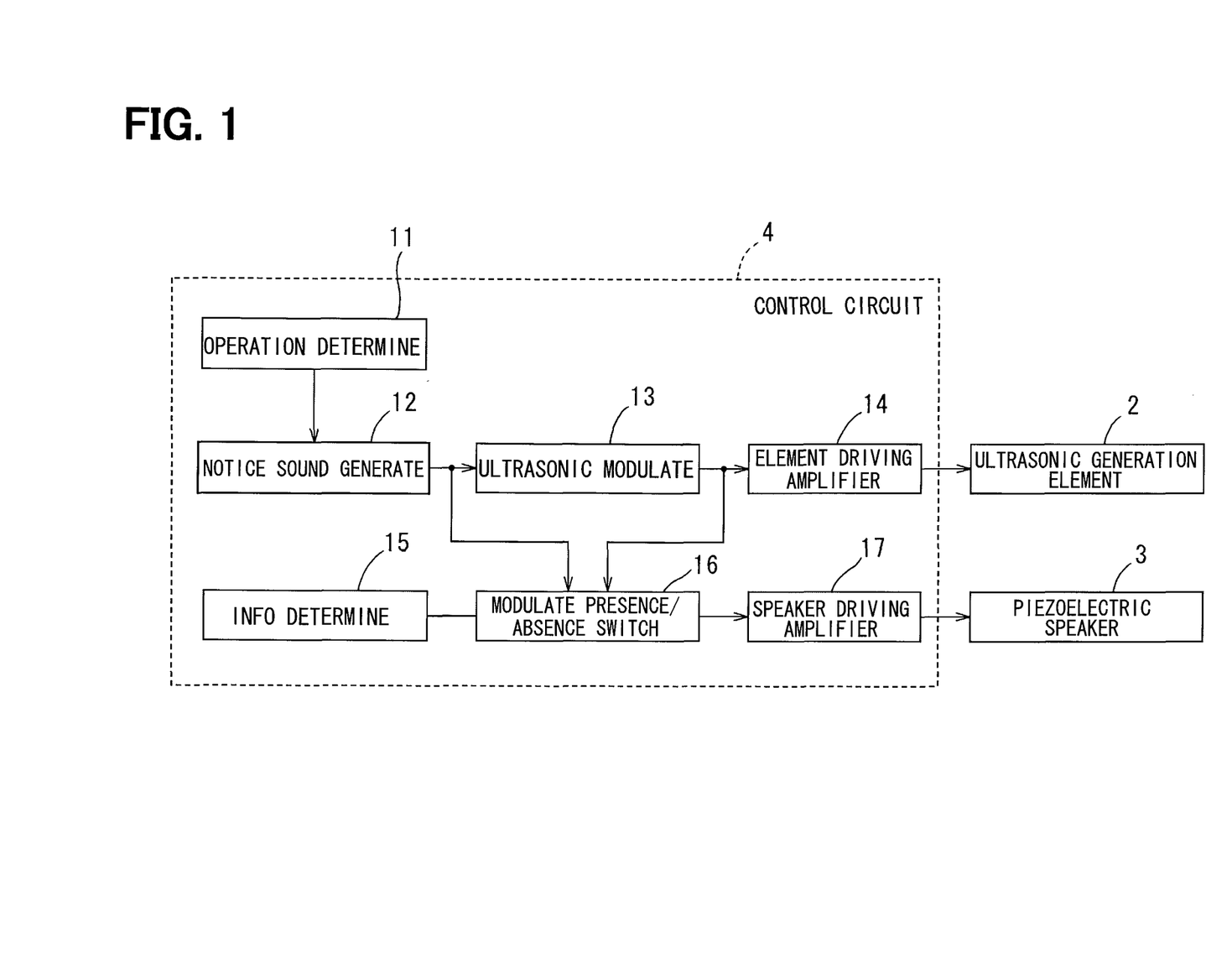
FIG. 1 is a diagram illustrating a schematic diagram of a vehicle presence notification apparatus according to a first example of an embodiment of the present disclosure.

The following will explain the control circuit 4 with reference to FIG. 1. The control circuit 4 includes the following (a) to (g): (a) an operation determination device (also referred to as means or section) 11 to determine whether a driving state of the vehicle S matches with a notice sound generation condition; (b) a notice sound generation device (also referred to means or section) 12 that generates a "frequency signal forming a notice sound (audible sound signal)" when the operation determination device 11 determines that the driving state of the vehicle S matches with the notice sound generation condition; (c) an ultrasonic modulation device (also referred to means or section) 13 that applies a modulation to the "frequency signal forming the notice sound" outputted from the notice sound generation device 12, thereby preparing an ultrasonic frequency that is referred to as an "ultrasonic modulated frequency signal forming the notice sound"; (d) an ultrasonic element driving amplifier 14 that drives the ultrasonic generation elements 2 based on the "ultrasonic modulated frequency signal forming the notice sound" outputted from the ultrasonic modulation device 13; (e) an information determination device (also referred to as means or section) 15 that determines whether the vehicular information given to the control circuit 4 matches with a predetermined first condition or a predetermined second condition, when the operation determination device 11 determines that the driving state of the vehicle S matches with the notice sound generation condition; (f) a modulation presence or absence switch device (also referred to as means or section) 16 that selects the "frequency signal forming the notice sound" outputted from the notice sound generation device 12 when the information determination device 15 determines that the vehicular information matches with the first condition, or the "ultrasonic modulated frequency signal forming the notice sound" outputted from the ultrasonic wave modulation device 13 when the information determination device 15 determines that the vehicular information matches with the second condition; and (g) a piezoelectric speaker driving amplifier 17 that drives the audible-sound generation piezoelectric speakers 3 based on the "frequency signal forming the notice sound" or "ultrasonic modulated frequency signal forming the notice sound" selected by the modulation presence or absence switch device 16.

The following will explain the above devices (a)-(g) included in the control circuit 4. It is noted that the operation determination device 11, the notice sound generation device 12, the ultrasonic modulation device 13, and the information determination device 15 may be control programs of a microcomputer contained in the control circuit 4. For example, the operation determination device 11 and the information determination device 15 may be provided as being integrated into a common one.

(Explanation of Operation Determination Device 11)

The operation determination device 11 determines that the driving state of the vehicle S matches with the notice sound generation condition when the vehicle travel takes place at a vehicle speed equal to or less than a predetermined value (for example, 20 km/h), thereby causing or instructing the notice sound generation device 12 to operate.

(Explanation of Notice Sound Generation Device 12)

The notice sound generation device 12 is provided by a notice sound generation program (sound software program). When the operation instruction is given from the operation determination device 11, the notice sound generation device 12 prepares a "frequency signal forming the notice sound"

that is an electrical signal having an audible frequency (e.g., an electrical signal forming a dummy engine sound), using a digital technique.

(Explanation of Ultrasonic Modulation Device 13)

The ultrasonic modulation device 13 applies an ultrasonic modulation to the "frequency signal forming the notice sound" outputted from the notice sound generation device 12, thereby preparing an ultrasonic frequency. As a detailed example of the ultrasonic modulation device 13 according to the present example uses an amplitude modulation (AM). In the AM, the output signal of the notice sound generation device 12 is modulated into an amplitude change (increase and decrease in voltage) in an ultrasonic frequency. The ultrasonic frequency is a frequency of the sound pressure increased portion X (see FIG. 3B) in the high order resonance portion that exists in an ultrasonic frequency band of the reproducible frequency of the audible-sound generation piezoelectric speaker 3, for instance. That is, the frequency signal forming the notice sound is modulated into the ultrasonic frequency of the sound pressure increased portion X. It is noted that without need to be limited to the AM, the ultrasonic modulation device 13 may use another modulation such as a pulse width modulation (PWM) in which the output signal of the notice sound generation device 12 is modulated into a change in a predetermined pulse width (width between pulses) in an ultrasonic frequency.

The following will explain an example of the ultrasonic modulation by the ultrasonic modulation device 13 with reference to FIGS. 4A to 4E. The "frequency signal forming the notice sound" inputted into the ultrasonic modulation device 13 is assumed to be a voltage change illustrated in FIG. 4A. (In the drawings, the waveform of a single frequency is illustrated for helping understanding). Further, the ultrasonic wave oscillator included in the control circuit 4 is assumed to oscillate in the ultrasonic frequency (ultrasonic frequency of the sound pressure increased portion X) illustrated in FIG. 4B.

Figure 4A:
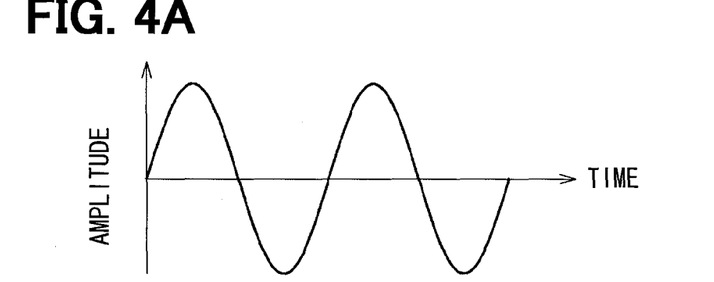
FIGS. 4A, 4B, 4C, 4D, and 4E are diagrams for explaining a principle of a parametric speaker according to the first example.
Figure 4B:
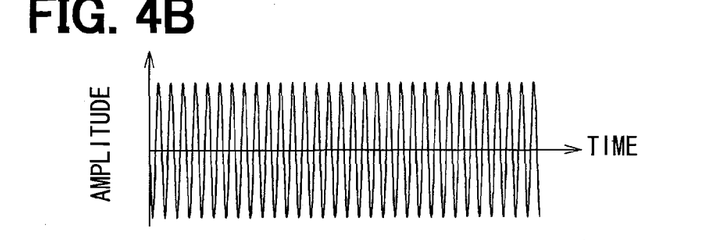
Figure 4C:
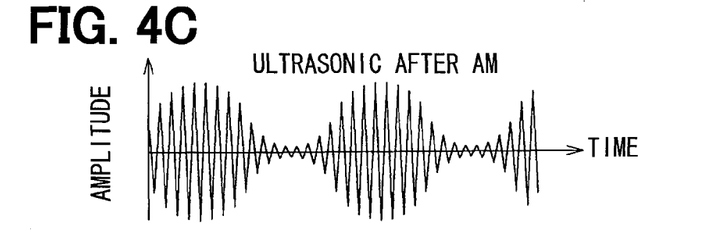

Then, as illustrated in FIG. 4C, the ultrasonic modulation device 13 operates as follows: (i) depending on the increase of the voltage of a frequency of the "frequency signal forming the notice sound," an amplitude of the voltage due to the ultrasonic vibration is enlarged; and (ii) depending on the decrease of the voltage of the frequency of the "frequency signal forming the notice sound," an amplitude of the voltage due to the ultrasonic vibration is reduced. Thus, the ultrasonic modulation device 13 modulates the "frequency signal forming the notice sound" inputted from the notice sound generation device 12 into the "amplitude change in oscillating voltage" of the ultrasonic frequency.

(Explanation of Ultrasonic Element Driving Amplifier 14)

The ultrasonic element driving amplifier 14 is an amplification device (also referred to as means) to drive the ultrasonic generation elements 2 (for example, B class amplifier or D class amplifier), based on the "ultrasonic modulated frequency signal forming the notice sound" prepared by the ultrasonic modulation device 13. The applied voltage (charge and discharge state) of each ultrasonic generation element 2 is controlled; thereby, each ultrasonic generation element 2 generates an ultrasonic wave that is prepared by applying the modulation to the "frequency signal forming the notice sound."

(Explanation of Information Determination Device 15)

The information determination device 15 determines whether the vehicle information matches with the predetermined first condition or the predetermined second condition, as mentioned above. There is no need to limit the first and second conditions to specific ones. Here, for helping understanding, a vehicle speed is used as an example to specify the conditions.

As a specific example, the information determination device 15 determines whether the vehicle speed as the vehicular information is less than a predetermined vehicle speed (for example, 10 km/h) (an example of the first condition) or equal to or greater than a predetermined vehicle speed (for example, 10 km/h) (an example of the second condition). That is, when the vehicle speed is less than the predetermined vehicle speed, the first condition is satisfied; when the vehicle speed is equal to or greater than the predetermined vehicle speed, the second condition is satisfied.

(Explanation of Modulation Presence or Absence Switch Device 16)

The modulation presence or absence switch device 16 has a function of a selection switch which switches the signal given to the piezoelectric speaker driving amplifier 17 between the "frequency signal forming the notice sound," or the "ultrasonic modulated frequency signal forming the notice sound," based on the determination result (first condition or second condition) of the information determination device 15. In specific, the modulation presence or absence switch device 16 of the present example operates as follows. (i) When the vehicle speed is less than the predetermined vehicle speed (when the information determination device 15 determines that the vehicular information matches with the first condition), the "frequency signal forming the notice sound" outputted from the notice sound generation device 12 is given to the piezoelectric speaker driving amplifier 17. (ii) When the vehicle speed is equal to or greater than the predetermined vehicle speed (when the information determination device 15 determines that the vehicular information matches with the second condition), the "ultrasonic modulated frequency signal forming the notice sound" outputted from the ultrasonic modulation device 13 is given to the piezoelectric speaker driving amplifier 17.

(Explanation of Piezoelectric Speaker Driving Amplifier 17)

The piezoelectric speaker driving amplifier 17 is a amplification device to drive the audible-sound generation piezoelectric speakers 3 (for example, B class amplifier or D class amplifier) based on the "frequency signal forming the notice sound" or the "ultrasonic modulated frequency signal forming the notice sound" selected by the modulation presence or absence switch device 16. The applied voltage (charge and discharge state) of each audible-sound generation piezoelectric speaker 3 is controlled; thereby, each audible-sound generation piezoelectric speaker 3 generates an "audible sonic wave forming the notice sound," or an "ultrasonic wave prepared by modulating the frequency signal forming the notice sound."

(Operation of Vehicle Presence Notification Apparatus with First Condition Satisfied)

It is premised that (i) the driving state of the vehicle S matches with the notice sound generation condition and (ii) the vehicle speed is less than the predetermined vehicle speed (i.e., when the information determination device 15 determines that the vehicular information matches with the first condition). In the vehicle presence notification apparatus, (i) each ultrasonic wave generating element 2 emits the "ultrasonic wave (inaudible sonic wave) prepared by modulating the ultrasonic signal forming the notice sound" illustrated in FIG. 4C towards an area ahead of the vehicle; and, simultaneously, (ii) each audible-sound generation piezoelectric speaker 3 emits directly the "sonic wave (audible sound) forming the notice sound."

Figure 4D:
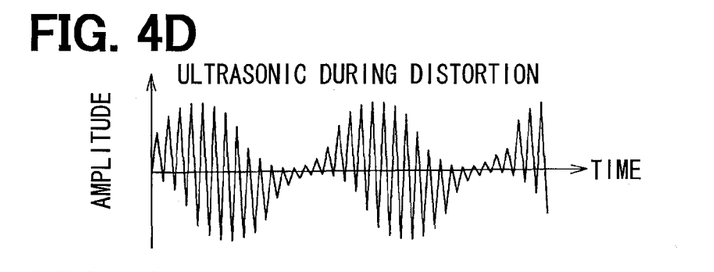
Figure 4E:
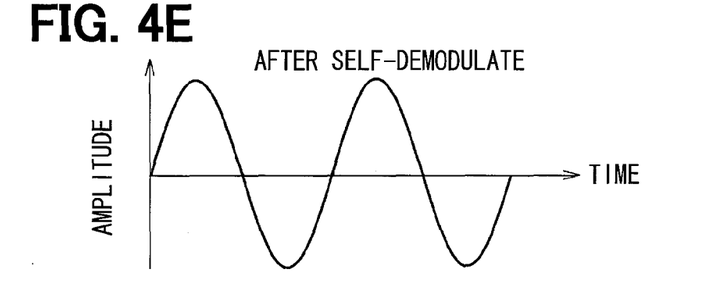

As illustrated in FIG. 4D, as the ultrasonic wave emitted by each ultrasonic generation element 2 propagates in the air, the ultrasonic wave having a short wavelength is distorted and smoothed by virtue of the viscosity of the air, etc. Thereby, as illustrated in FIG. 4E, the amplitude component contained in the ultrasonic wave undergoes a self-demodulation during the propagating in the air, resulting in the reproduction of the "notice sound by parametric speaker" in an area ahead of the vehicle.

In FIG. 5A, the broken line a illustrates a reachable range of the "notice sound by parametric speaker" with a predetermined sound pressure (e.g., >=50 dB) generated by each ultrasonic generation element 2. The "notice sound by parametric speaker" is generated (i.e., reproduced) based on the self-modulation of the ultrasonic wave in the air; the directionality of the notice sound by parametric speaker is narrower than that of the notice sound by dynamic speaker. Thus, as illustrated by the broken line a in FIG. 5A, the notice sound by parametric speaker can be generated (i.e., reproduced or heard) only in a limited area in the heading direction of the vehicle.

In contrast, each audible-sound generation piezoelectric speaker 3 directly emits an audible "notice sound" to an area surrounding the vehicle. That is, the audible-sound generation piezoelectric speaker 3 generates the "notice sound by dynamic speaker."

In FIG. 5A, the broken line β illustrates a reachable range of the "notice sound by dynamic speaker" with a predetermined sound pressure (e.g., >=50 dB) generated by each audible-sound generation piezoelectric speaker 3. Thus, as a frequency decreases, the directionality becomes low or wide. As illustrated by the broken line β in FIG. 5A, the "notice sound by dynamic speaker" has a low or wide directionality; thereby, the notice sound can be heard in a wide range of an area surrounding the vehicle.

(Operation of Vehicle Presence Notification Apparatus with Second Condition Satisfied)

It is premised that the driving state of the vehicle S matches with the notice sound generation condition and the vehicle speed is equal to or greater than the predetermined vehicle speed (i.e., when the information determination device 15 determines that the vehicular information matches with the second condition). Under the premise, each ultrasonic generation element 2 and each audible-sound generation piezoelectric speaker 3 emit the "ultrasonic modulated ultrasonic wave (inaudible sonic wave) forming the notice sound" illustrated in FIG. 4C towards an area ahead of the vehicle.

As illustrated in FIG. 4D, as the ultrasonic wave emitted by each ultrasonic wave generation element 2 or each audible-sound generation piezoelectric speaker 3 propagates in the air, the ultrasonic wave having a short wavelength is distorted and smoothed by virtue of the viscosity of the air, etc. Thereby, as illustrated in FIG. 4E, the amplitude component contained in the ultrasonic wave undergoes a self-demodulation during the propagating in the air, resulting in the reproduction of the "notice sound by parametric speaker" in an area ahead of the vehicle.

In FIG. 5B, the broken line a illustrates a reachable range of the "notice sound by parametric speaker" with a predetermined sound pressure (e.g., >=50 dB) generated by each ultrasonic generation element 2. The "notice sound by parametric speaker" is generated (i.e., reproduced) based on the self-modulation of the ultrasonic wave in the air; the directionality of the notice sound is narrower as compared with that by dynamic speaker. Thus, as illustrated by the broken line a in FIG. 5A, the notice sound can be generated (i.e., reproduced) only in a limited area in the heading direction of the vehicle.

In contrast, in FIG. 5B, the broken line β illustrates a reachable range of the "notice sound by parametric speaker" with a predetermined sound pressure (e.g., >=50 dB) generated by each ultrasonic generation element 2 and each audible-sound generation piezoelectric speaker 3. Thus, the "notice sound by parametric speaker" by each audible-sound generation piezoelectric speaker 3 is added to the "notice sound by parametric speaker" by each ultrasonic generation element 2. The notice sound can be heard in a range covering a position more distant ahead of the vehicle as compared with the case that the first condition is satisfied.

Effect 1 of First Example

The vehicle presence notification apparatus of the first example is provided as described above. That is, more than one audible-sound generation piezoelectric speaker 3 is used which provides a primary resonance portion B in an audible frequency band. Each audible-sound generation piezoelectric speaker 3 switches the generation of the notice sound, depending on the vehicular information, between the generation of the "audible notice sound by dynamic speaker," and the generation of the "inaudible ultrasonic-modulated notice sound by parametric speaker." Thus, both the "audible notice sound by dynamic speaker," and the "inaudible ultrasonic-modulated notice sound by parametric speaker" are generated from the audible-sound generation piezoelectric speaker 3 that provides a wide versatility and a reduced cost. The cost of the notice sound generator 1 can be held down; the costs of the vehicle presence notification apparatus can be suppressed.

Effect 2 of First Example

In the vehicle presence notification apparatus of the first example, in addition to the audible-sound generation piezoelectric speaker 3, more than one ultrasonic generation element 2 is provided which provides a primary resonance portion A existing in an ultrasonic frequency band. The ultrasonic generation elements 2 generate only the notice sound by parametric speaker (i.e., the ultrasonic wave prepared by ultrasonic-modulating the signal forming the notice sound).

When the driving state of the vehicle S matches with the notice sound generation condition and the vehicle S travels at a predetermined low speed, the information determination device 15 determines that the vehicular information matches with the first condition. In this case, as illustrated in FIG. 5A, each ultrasonic wave generation element 2 generates a "notice sound by parametric speaker"; simultaneously, each audible-sound generation piezoelectric speaker 3 generates a "notice sound by dynamic speaker." Therefore, at a low speed of the vehicle S, the notice sound can be heard in not only an area ahead of the vehicle S, but also in an area surrounding the vehicle S. Even a pedestrian located in a direction different from the heading direction of the vehicle can hear the notice sound to thereby recognize the presence of the vehicle S.

Further, when the driving state of the vehicle S matches with the notice sound generation condition and the vehicle S travels at a predetermined intermediate speed, the information determination device 15 determines that the vehicular information matches with the second condition. In this case, as illustrated in FIG. 5B, each ultrasonic generation element 2 and each audible-sound generation piezoelectric speaker 3 generate a "notice sound by parametric speaker." Therefore, at the predetermined intermediate speed of the vehicle S, even a pedestrian located more distant ahead of the vehicle S can hear the notice sound to thereby recognize the presence of the vehicle S.

Second Example

Figure 6:
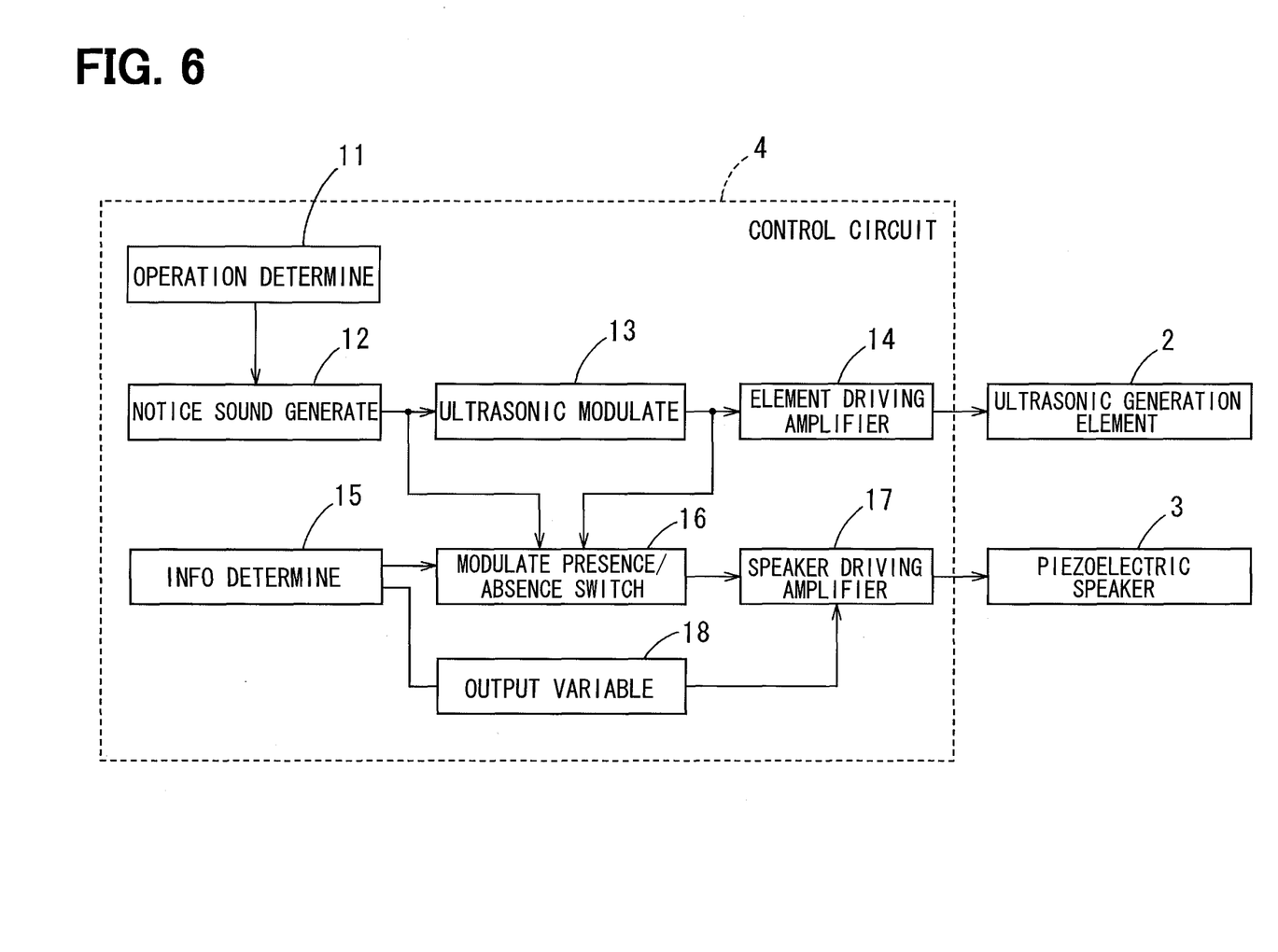
FIG. 6 is a diagram illustrating a schematic diagram of a vehicle presence notification apparatus according to a second example.

A second example will be explained with reference to FIGS. 6, 7A, 7B. In the present example, one having the same reference number as that of one in the first example has the same function as that of the one in the first example. The vehicle presence notification apparatus according to the present second example is provided as follows. (i) The vehicular information satisfies the first condition and each audible-sound generation piezoelectric speaker 3 is thereby caused to perform the audible notice sound direct generation to generate directly an audible notice sound. In this case, the generation sound pressure from the audible-sound generation piezoelectric speaker 3 is varied depending on vehicular information including a vehicle speed, weather, or ambient noise. (ii) When the information determination device 15 determines that the vehicular information satisfies the second condition, the audible-sound generation piezoelectric speaker 3 is caused to emit an ultrasonic wave that is prepared by applying an ultrasonic modulation to a signal which forms a notice sound. In this case, the generation sound pressure from the audible-sound generation piezoelectric speaker 3 is varied depending on vehicular information including a vehicle speed, weather, or ambient noise.

As a detailed example, the control circuit 4 of the present example includes a piezoelectric output variable device 18 to perform a variation in an amplification gain of the piezoelectric speaker driving amplifier 17. The piezoelectric output variable device 18 may vary the power voltage (supply voltage) of the piezoelectric speaker driving amplifier 17. The piezoelectric output variable device 18 may vary a voltage of a signal before amplification (voltage of an input signal) of the piezoelectric speaker driving amplifier 17. The piezoelectric output variable device 18 may switch the number of the audible-sound generation piezoelectric speakers 3. The variation of the amplification gain by the piezoelectric output variable device 18 may be made stepwise or continuously. As a specific example in the present example, the variation is made in three steps, a small gain providing a small amplification gain, an intermediate gain providing an intermediate amplification gain, and a large gain providing a large amplification gain.

In addition, the information determination device 15 of the second example that has a function of determining the first condition and the second condition further controls the piezoelectric output variable device 18 based on the vehicular information. The amplification gain of the piezoelectric speaker driving amplifier 17 is thereby varied.

The vehicular information which is used for varying the amplification gain of the piezoelectric speaker driving amplifier 17 need not limited to any one. As an example of helping understanding, the present example uses a vehicle speed. When the vehicle speed is less than a first predetermined vehicle speed (for example, less than 4 km/h: when the first condition is satisfied), the information determination device 15 controls the piezoelectric output variable device 18 to set the amplification gain of the piezoelectric speaker driving amplifier 17 to the "small gain." Thus, the reachable range of the notice sound by dynamic speaker from the audible-sound generation piezoelectric speaker 3 is limited within the broken line β1 in FIG. 7A. While the presence of the vehicle S can be reported using the notice sound in a necessary range at a predetermined very low speed of the vehicle S, the vehicle noise can be suppressed.

Figure 7A:
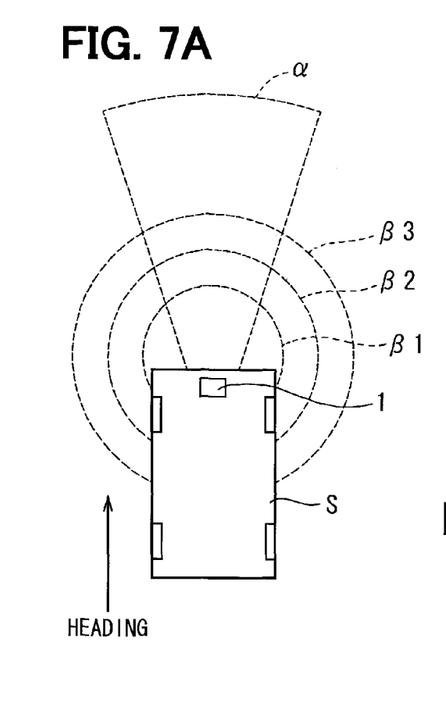
FIG. 7A is a diagram illustrating a reachable range of a notice sound at a low speed of a vehicle according to the second example.

When the vehicle speed is equal to or greater than the first predetermined vehicle speed and less than a second predetermined vehicle speed (for example, equal to or greater than 4 km/h and less than 7 km/h: when the first condition is satisfied), the information determination device 15 controls the piezoelectric output variable device 18 to set the amplification gain of the piezoelectric speaker driving amplifier 17 to the "intermediate gain." Thus, as the vehicle speed increases, the reachable range of the notice sound by dynamic speaker from the audible-sound generation piezoelectric speaker 3 is extended to the broken line β2 in FIG. 7A. While the presence of the vehicle S can be reported using the notice sound in a necessary range at a predetermined little low speed of the vehicle S, the vehicle noise can be suppressed.

When the vehicle speed is equal to or greater than the second predetermined vehicle speed and less than a third predetermined vehicle speed (for example, equal to or greater than 7 km/h and less than 10 km/h: when the first condition is satisfied), the information determination device 15 controls the piezoelectric output variable device 18 to set the amplification gain of the piezoelectric speaker driving amplifier 17 to the "large gain." Thus, as the vehicle speed increases, the reachable range of the notice sound by dynamic speaker from the audible-sound generation piezoelectric speaker 3 is extended to the broken line β3 in FIG. 7A. The presence of the vehicle S can be thus reported using the notice sound in a necessary range at a predetermined low speed of the vehicle S.

Figure 7B:
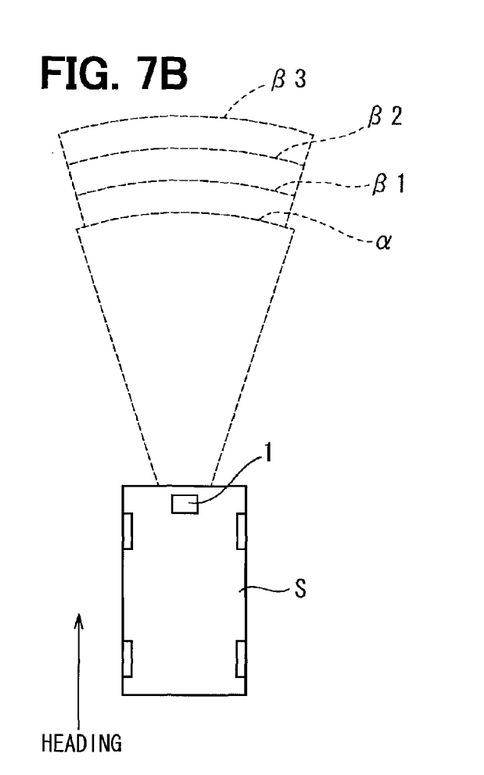
FIG. 7B is a diagram illustrating a reachable range of a notice sound at an intermediate speed of a vehicle according to the second example.

When the vehicle speed is equal to or greater than the third predetermined vehicle speed and less than a fourth predetermined vehicle speed (for example, equal to or greater than 10 km/h and less than 14 km/h: when the second condition is satisfied), the information determination device 15 controls the piezoelectric output variable device 18 to set the amplification gain of the piezoelectric speaker driving amplifier 17 to the "small gain." As the vehicle speed increases, the reachable range of the notice sound by parametric speaker from each ultrasonic generation element 2 and each audible-sound generation piezoelectric speaker 3 is within the broken line β1 in FIG. 7B. This can provide both the effect of suppressing the vehicle noise arising ahead of the vehicle and the effect of conveying the notice sound to a pedestrian located in an area ahead of the vehicle.

When the vehicle speed is equal to or greater than the fourth predetermined vehicle speed and less than a fifth predetermined vehicle speed (for example, equal to or greater than 14 km/h and less than 17 km/h: when the second condition is satisfied), the information determination device 15 controls the piezoelectric output variable device 18 to set the amplification gain of the piezoelectric speaker driving amplifier 17 to the "intermediate gain." As the vehicle speed increases, the reachable range of the notice sound by parametric speaker from each ultrasonic generation element 2 and each audible-sound generation piezoelectric speaker 3 is extended to the broken line β2 in FIG. 7B. This can provide both the effect of suppressing the vehicle noise arising ahead of the vehicle and the effect of conveying the notice sound to a pedestrian located in an area ahead of the vehicle.

When the vehicle speed is equal to or greater than the fifth predetermined vehicle speed (for example, equal to or greater than 17 km/h: when the second condition is satisfied), the information determination device 15 controls the piezoelectric output variable device 18 to set the amplification gain of the piezoelectric speaker driving amplifier 17 to the "large gain." As the vehicle speed increases, the reachable range of the notice sound by parametric speaker from each ultrasonic generation element 2 and each audible-sound generation piezoelectric speaker 3 is extended to the broken line β3 in FIG. 7B. The notice sound can reach even a pedestrian located in an area distant ahead of the vehicle.

Third Example

Figure 8:
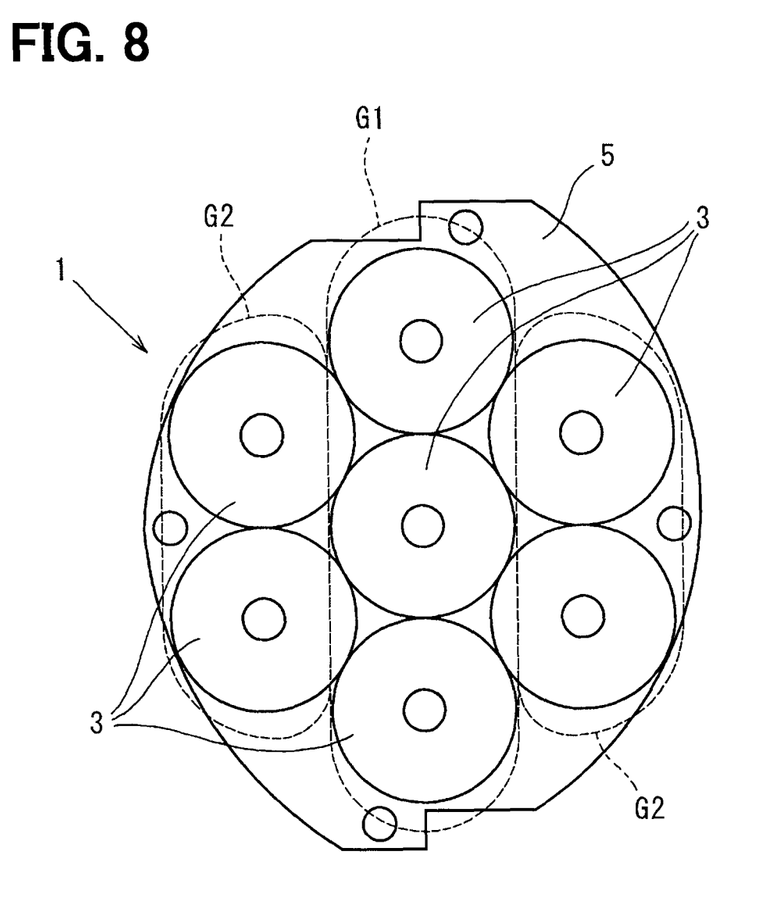
FIG. 8 is a diagram illustrating an example of arrangement of an audible-sound generation piezoelectric speaker according to a third example.

A third example will be explained with reference to FIG. 8. In the third example, the ultrasonic generation elements 2 in the first example are replaced with audible-sound generation piezoelectric speakers 3. That is, the notice sound generator 1 of the third example includes (i) a first group G1 of the audible-sound generation piezoelectric speakers 3 which generate only a "notice sound using an ultrasonic wave (notice sound by parametric speaker)," and (ii) a second group G2 of the audible-sound generation piezoelectric speakers 3 which generate both a "notice sound using an audible sound (notice sound by dynamic speaker)," and a "notice sound using an ultrasonic wave (notice sound by parametric speaker)."

The third example does not use the ultrasonic generation element 2, which requires a high cost without providing a general versatility. The cost of the notice sound generator 1 can be further reduced from that of the first example. The costs of the vehicle presence notification apparatus can be further suppressed.

[Modifications]

The above examples use a vehicle speed as vehicular information for determining the first condition and the second condition. There is no need to be limited thereto. The determination for the first and second conditions can be made depending on other vehicular information. In this case, the other vehicular information may include a weather state such as a rainy state or a snowy state, and an ambient noise level.

The third example uses the vehicle speed as vehicular information for determining the variation of the generation sound pressure of the audible-sound generation piezoelectric speaker 3. There is no need to be limited thereto. The variation of the generation sound pressure may be made depending on other vehicular information. In this case, the other vehicular information may include a weather state such as a rainy state or a snowy state, and an ambient noise level.

In the above examples, the "vehicle information for determining the first and second conditions" and the "vehicle information for varying the generation sound pressure of the audible-sound generation piezoelectric speaker 3" are the same vehicular information (i.e., vehicle speed). There is no need to be limited thereto. For instance, the determination of the first and second conditions may be made depending on the vehicle speed, whereas the variation of the generation sound pressure of the audible-sound generation piezoelectric speaker 3 may be made depending on a rainfall detected with a rain sensor or an ambient noise level detected with a microphone outside the vehicle.

The above examples use an ultrasonic generation device dedicated for parametric speaker. That is, in the first example, the ultrasonic generation element 2 is used; in the third example, the first group G1 of the audible-sound generation piezoelectric speakers 3 is used. There is no need to be limited thereto. The ultrasonic generation device dedicated for parametric speaker may not be used. For instance, a notice sound may be generated by using only the audible-sound generation piezoelectric speakers 3 which switches the generation of the notice sound between a "notice sound using an audible sound (notice sound by dynamic speaker)," and a "notice sound using an ultrasonic wave (notice sound by parametric speaker)."

The notice sound generator 1 in the above examples may be combined with a vehicular horn device which can generate an alarm whistle sound. Thereby, the "notice sound using an audible sound (notice sound by dynamic speaker)" may be generated from the vehicular horn device.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicle presence notification apparatus that generates a notice sound in an area outside of a vehicle when a driving condition to report a presence of the vehicle is satisfied, the vehicle presence notification apparatus comprising:
   an audible-sound generation piezoelectric speaker that provides a primary resonance portion existing in an audible frequency band,
   wherein:
      when vehicular information satisfies a predetermined first condition, the vehicular information being a travel state of the vehicle, the audible-sound generation piezoelectric speaker is caused to perform an audible notice sound direct generation to generate directly a notice sound that is audible;
      when the vehicular information satisfies a predetermined second condition, the audible-sound generation piezoelectric speaker is caused to perform an ultrasonic emission to emit an ultrasonic wave that is prepared by applying an ultrasonic modulation to a signal to form a notice sound; and
      when a vehicle speed of the vehicle is less than a predetermined value, the vehicular information satisfies the predetermined first condition, whereas
      when the vehicle speed of the vehicle is equal to or greater than the predetermined value, the vehicular information satisfies the predetermined second condition.

2. The vehicle presence notification apparatus according to claim 1, further comprising:
   a piezoelectric output variable device to perform a variation of a generation sound pressure of the audible-sound generation piezoelectric speaker,
   wherein:
      when the audible-sound generation piezoelectric speaker is caused to perform the audible notice sound direct generation,
      the piezoelectric output variable device performs the variation of the generation sound pressure of the audible-sound generation piezoelectric speaker depending on the vehicular information.

3. The vehicle presence notification apparatus according to claim 1, further comprising:
   a piezoelectric output variable device to perform a variation of a generation sound pressure of the audible-sound generation piezoelectric speaker,
   wherein:
      when the audible-sound generation piezoelectric speaker is caused to perform the ultrasonic emission, the piezoelectric output variable device performs the variation of the generation sound pressure of the audible-sound generation piezoelectric speaker depending on the vehicular information.

4. The vehicle presence notification apparatus according to claim 1, further comprising:
an ultrasonic generation element that provides a primary resonance portion existing in an ultrasonic frequency band, the ultrasonic generation element being provided separately from the audible-sound generation piezoelectric speaker,
wherein:
the ultrasonic generation element emits only an ultrasonic wave that is prepared by applying an ultrasonic modulation to a signal to form a notice sound.

5. A vehicle presence notification apparatus that generates a notice sound in an area outside of a vehicle when a driving condition to report a presence of the vehicle is satisfied, the vehicle presence notification apparatus comprising:
an audible-sound generation piezoelectric speaker that provides a primary resonance portion existing in an audible frequency band,
wherein:
when vehicular information satisfies a predetermined first condition, the vehicular information being a travel environment of the vehicle, the audible-sound generation piezoelectric speaker is caused to perform an audible notice sound direct generation to generate directly a notice sound that is audible;
when the vehicular information satisfies a predetermined second condition, the audible-sound generation piezoelectric speaker is caused to perform an ultrasonic emission to a signal to form a notice sound; and
when an ambient noise level of the vehicle is less than a predetermined value, the vehicular information satisfies the predetermined first condition, whereas when the ambient noise level of the vehicle is equal to or greater than the predetermined value, the vehicular information satisfies the predetermined second condition.

6. The vehicle presence notification apparatus according to claim 5, further comprising:
a piezoelectric output variable device to perform a variation of a generation sound pressure of the audible-sound generation piezoelectric speaker,
wherein:
when the audible-sound generation piezoelectric speaker is caused to perform the audible notice sound direct generation,
the piezoelectric output variable device performs the variation of the generation sound pressure of the audible-sound generation piezoelectric speaker depending on the vehicular information.

7. The vehicle presence notification apparatus according to claim 5, further comprising:
a piezoelectric output variable device to perform a variation of a generation sound pressure of the audible-sound generation piezoelectric speaker,
wherein:
when the audible-sound generation piezoelectric speaker is caused to perform the ultrasonic emission,
the piezoelectric output variable device performs the variation of the generation sound pressure of the audible-sound generation piezoelectric speaker depending on the vehicular information.

8. The vehicle presence notification apparatus according to claim 5, further comprising:
an ultrasonic generation element that provides a primary resonance portion existing in an ultrasonic frequency band, the ultrasonic generation element being provided separately from the audible-sound generation piezoelectric speaker,
wherein:
the ultrasonic generation element emits only an ultrasonic wave that is prepared by applying an ultrasonic modulation to a signal to form a notice sound.

9. A vehicle presence notification apparatus that generates a notice sound in an area outside of a vehicle when a driving condition to report a presence of the vehicle is satisfied, the vehicle presence notification apparatus comprising:
an audible-sound generation piezoelectric speaker that provides a primary resonance portion existing in an audible frequency band,
wherein:
when vehicular information satisfies a predetermined first condition, the vehicular information being a travel environment of the vehicle, the audible-sound generation piezoelectric speaker is caused to perform an audible notice sound direct generation to generate directly a notice sound that is audible;
when the vehicular information satisfies a predetermined second condition, the audible-sound generation piezoelectric speaker is caused to perform an ultrasonic emission to emit an ultrasonic wave that is prepared by applying an ultrasonic modulation to a signal to form a notice sound; and
when a weather state around the vehicle is other than a rainy state or a snowy state, the vehicular information satisfies the predetermined first condition, whereas when the weather state around the vehicle is a rainy state or a snowy state, the vehicular information satisfies the predetermined second condition.

10. The vehicle presence notification apparatus according to claim 9, further comprising:
a piezoelectric output variable device to perform a variation of a generation sound pressure of the audible-sound generation piezoelectric speaker,
wherein:
when the audible-sound generation piezoelectric speaker is caused to perform the audible notice sound direct generation,
the piezoelectric output variable device performs the variation device performs the variation of the generation sound pressure of the audible-sound generation piezoelectric speaker depending on the vehicular information.

11. The vehicle presence notification apparatus according to claim 9, further comprising:
a piezoelectric output variable device to perform a variation of a generation sound pressure of the audible-sound generation piezoelectric-speaker,
wherein:
when the audible-sound generation piezoelectric speaker is caused to perform the ultrasonic emission,
the piezoelectric output variable device performs the variation of the generation sound pressure of the audible-sound generation piezoelectric speaker depending on the vehicular information.

12. The vehicle presence notification apparatus according to claim 9, further comprising:
an ultrasonic generation element that provides a primary resonance portion existing in an ultrasonic frequency band, the ultrasonic generation element being provided separately from the audible-sound generation piezoelectric speaker, wherein:
the ultrasonic generation element emits only an ultrasonic wave that is prepared by applying an ultrasonic modulation to a signal to form a notice sound.

* * * * *